United States Patent
Ramamurthi et al.

(10) Patent No.: US 10,721,715 B2
(45) Date of Patent: Jul. 21, 2020

(54) LINK-AWARE STREAMING ADAPTATION

(71) Applicant: INTEL IP CORPORATION, Santa Clara, CA (US)

(72) Inventors: Vishwanath Ramamurthi, Sunnyvale, CA (US); Ozgur Oyman, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 711 days.

(21) Appl. No.: 14/763,123

(22) PCT Filed: Feb. 27, 2014

(86) PCT No.: PCT/US2014/019031
§ 371 (c)(1),
(2) Date: Jul. 23, 2015

(87) PCT Pub. No.: WO2014/134309
PCT Pub. Date: Sep. 4, 2014

(65) Prior Publication Data
US 2015/0373077 A1 Dec. 24, 2015

Related U.S. Application Data

(60) Provisional application No. 61/771,698, filed on Mar. 1, 2013.

(51) Int. Cl.
*G06F 15/16* (2006.01)
*H04W 72/00* (2009.01)
(Continued)

(52) U.S. Cl.
CPC ........ *H04W 72/005* (2013.01); *H04B 7/0452* (2013.01); *H04B 7/0486* (2013.01);
(Continued)

(58) Field of Classification Search
CPC .................................................. H04W 72/005
(Continued)

(56) References Cited

U.S. PATENT DOCUMENTS

2002/0141446 A1* 10/2002 Koga .................. H04L 12/4625
370/468
2004/0117455 A1* 6/2004 Kaminsky ............... H04L 67/42
709/214
(Continued)

FOREIGN PATENT DOCUMENTS

CN 101835029 A 9/2010
CN 102104538 A 6/2011
(Continued)

OTHER PUBLICATIONS

3GPP TS 26.247 version 10.2.0 Release 10; Universal Mobile Telecommunications System (UMTS); LTE; Transparent end-to-end Packet-switched Streaming Service (PSS); Adaptive Streaming over HTTP (3GP-DASH) Jul. 31, 2012.
(Continued)

*Primary Examiner* — Oscar A Louie
*Assistant Examiner* — Oluwatosin M Gidado
(74) *Attorney, Agent, or Firm* — Kowert, Hood, Munyon, Rankin & Goetzel, P.C.

(57) ABSTRACT

Technology to provide link aware streaming adaptation is disclosed. In an example, a mobile device can include computer circuitry configured to: receive a manifest file for an HTTP adaptive stream from a node; determine a physical layer goodput of the mobile device with the node; and select a representation in the manifest file for a selected period based, at least in part, on the physical layer goodput.

22 Claims, 10 Drawing Sheets

(51) Int. Cl.
| | |
|---|---|
| H04B 7/0456 | (2017.01) |
| H04B 7/0452 | (2017.01) |
| H04M 15/00 | (2006.01) |
| H04W 36/14 | (2009.01) |
| H04W 36/22 | (2009.01) |
| H04L 5/00 | (2006.01) |
| H04L 12/741 | (2013.01) |
| H04B 7/06 | (2006.01) |
| H04W 24/10 | (2009.01) |
| H04W 72/04 | (2009.01) |
| H04W 72/08 | (2009.01) |
| H04L 29/06 | (2006.01) |
| H04L 29/08 | (2006.01) |
| H04W 4/10 | (2009.01) |
| H04W 12/02 | (2009.01) |
| H04W 12/04 | (2009.01) |
| H04W 24/02 | (2009.01) |
| H04W 24/08 | (2009.01) |
| H04L 12/18 | (2006.01) |
| H04W 52/24 | (2009.01) |
| H04W 72/10 | (2009.01) |
| H04W 16/14 | (2009.01) |
| H04W 36/16 | (2009.01) |
| H04W 36/30 | (2009.01) |
| H04J 3/12 | (2006.01) |
| H04W 48/10 | (2009.01) |
| H04W 48/20 | (2009.01) |
| H04L 25/03 | (2006.01) |
| H04W 76/23 | (2018.01) |
| H04W 76/14 | (2018.01) |
| H04W 76/27 | (2018.01) |
| H04W 76/10 | (2018.01) |
| H04W 76/20 | (2018.01) |
| H04W 76/30 | (2018.01) |
| H04W 4/80 | (2018.01) |
| H04W 88/06 | (2009.01) |
| H04W 88/02 | (2009.01) |
| H04W 88/08 | (2009.01) |
| H04W 84/18 | (2009.01) |
| H04W 4/06 | (2009.01) |

(52) U.S. Cl.
CPC .............. *H04B 7/0626* (2013.01); *H04J 3/12* (2013.01); *H04L 5/0037* (2013.01); *H04L 12/184* (2013.01); *H04L 25/03* (2013.01); *H04L 45/74* (2013.01); *H04L 65/4038* (2013.01); *H04L 65/608* (2013.01); *H04L 65/80* (2013.01); *H04L 67/02* (2013.01); *H04M 15/8044* (2013.01); *H04W 4/10* (2013.01); *H04W 12/02* (2013.01); *H04W 12/04* (2013.01); *H04W 16/14* (2013.01); *H04W 24/02* (2013.01); *H04W 24/08* (2013.01); *H04W 24/10* (2013.01); *H04W 36/14* (2013.01); *H04W 36/165* (2013.01); *H04W 36/22* (2013.01); *H04W 36/30* (2013.01); *H04W 48/10* (2013.01); *H04W 48/20* (2013.01); *H04W 52/244* (2013.01); *H04W 72/044* (2013.01); *H04W 72/0406* (2013.01); *H04W 72/085* (2013.01); *H04W 72/087* (2013.01); *H04W 72/10* (2013.01); *H04W 76/10* (2018.02); *H04W 76/14* (2018.02); *H04W 76/20* (2018.02); *H04W 76/23* (2018.02); *H04W 76/27* (2018.02); *H04W 76/30* (2018.02); *H04W 4/06* (2013.01); *H04W 4/80* (2018.02); *H04W 84/18* (2013.01); *H04W 88/02* (2013.01); *H04W 88/06* (2013.01); *H04W 88/08* (2013.01); *Y02B 70/32* (2013.01); *Y02D 70/00* (2018.01); *Y02D 70/1224* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01); *Y02D 70/168* (2018.01); *Y02D 70/21* (2018.01); *Y02D 70/22* (2018.01); *Y02D 70/23* (2018.01); *Y02D 70/26* (2018.01); *Y02D 70/444* (2018.01)

(58) Field of Classification Search
USPC ......................................... 709/219
See application file for complete search history.

(56) References Cited

U.S. PATENT DOCUMENTS

| | | | |
|---|---|---|---|
| 2004/0160979 A1 | 8/2004 | Pepin et al. | |
| 2004/0196860 A1 | 10/2004 | Gao et al. | |
| 2011/0270913 A1* | 11/2011 | Jarnikov | H04N 21/23439 709/203 |
| 2012/0030331 A1* | 2/2012 | Karampatsis | H04L 41/0893 709/223 |
| 2012/0117225 A1* | 5/2012 | Kordasiewicz | H04L 65/1083 709/224 |
| 2012/0265847 A1* | 10/2012 | Swenson | H04L 65/1076 709/217 |
| 2012/0278496 A1 | 11/2012 | Hsu | |
| 2013/0182643 A1* | 7/2013 | Pazos | H04L 65/4076 370/328 |
| 2013/0227158 A1* | 8/2013 | Miller | H04L 65/60 709/231 |
| 2013/0326024 A1* | 12/2013 | Chen | H04L 65/4084 709/219 |
| 2014/0003516 A1* | 1/2014 | Soroushian | H04N 21/2387 375/240.13 |
| 2014/0019635 A1* | 1/2014 | Reznik | H04L 65/607 709/231 |
| 2014/0036667 A1* | 2/2014 | Balasubramanian | H04W 28/0231 370/230 |
| 2014/0040496 A1* | 2/2014 | Moorthy | H04L 65/4084 709/231 |
| 2014/0153460 A1* | 6/2014 | Shrivastava | H04W 52/0225 370/311 |
| 2014/0219346 A1* | 8/2014 | Ugur | H04N 19/00575 375/240.12 |
| 2014/0297869 A1* | 10/2014 | Brueck | H04L 65/607 709/226 |

FOREIGN PATENT DOCUMENTS

| | | |
|---|---|---|
| KR | 10-2013-0009740 A | 1/2013 |
| WO | WO 2011-059273 A2 | 5/2011 |

OTHER PUBLICATIONS

Information technology—Dynamic adaptive streaming over HTTP (DASH); Dec. 7, 2015; ISO/IEC 23009-1; Part 1 Media presentation descriptions and segment formats.

* cited by examiner

LINK-AWARE STREAMING ADAPTATION

RELATED APPLICATIONS

This application claims the benefit of and hereby incorporates by reference U.S. Provisional Patent Application Ser. No. 61/771,698, filed Mar. 1, 2013.

BACKGROUND

The growth of multimedia services, including streaming and conversational services, is one of the key drivers of the evolution to new mobile broadband technologies and standards. Digital video content is increasingly consumed in mobile devices. There are many video applications extensively used on mobile devices in daily life. For example, online video streaming include popular services such as YouTube and Hulu. Video recording and video conferencing include services such as Skype and Google Hangout. In 2011, YouTube had more than 1 trillion global views. Ten percent of the views were accessed via mobile phones or tablets. As more smart phones, tablets, and other mobile computing devices are purchased, their use for video recording and video conferencing will increase dramatically. With such high consumer demand for multimedia services coupled with developments in media compression and wireless network infrastructures, it is of interest to enhance the multimedia service capabilities of future cellular and mobile broadband systems and deliver high quality of experience (QoE) to the consumers, thereby ensuring ubiquitous access to video content and services from any location, at any time, with any device and technology.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
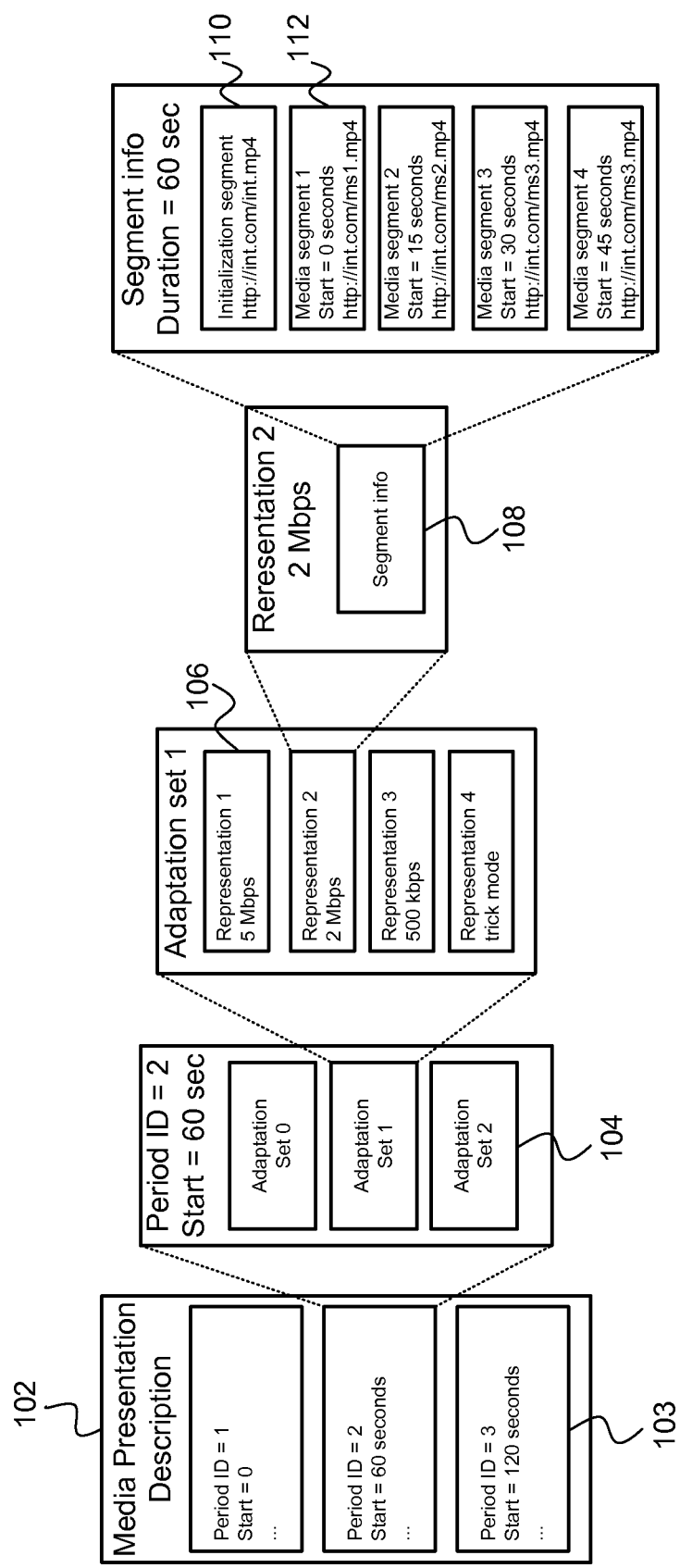
FIG. 1 illustrates a block diagram of a media presentation description (MPD) metadata file configuration in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Hypertext transfer protocol (HTTP) adaptive streaming (HAS) can be used as a form of multimedia delivery of Internet video. HTTP-based delivery can provide reliability and deployment simplicity due to a broad adoption of both HTTP and HTTP's underlying protocols, including transmission control protocol (TCP)/internet protocol (IP). HTTP-based delivery can enable easy and effortless streaming services by avoiding network address translation (NAT) and firewall traversal issues. HTTP-based delivery or streaming can also provide the ability to use standard HTTP servers and caches instead of specialized streaming servers. HTTP-based delivery can provide scalability due to minimal or reduced state information on a server side.

When using HAS to deliver internet multimedia content, a video client operating on a mobile device can be configured to perform the primary role in rate adaptation by choosing and requesting the appropriate video representation levels from a video server using an HTTP GET or partial GET command to retrieve data from a specified resource, such as a multimedia server. The video client initially builds up a buffer to a certain level before beginning to playback streaming multimedia content, such as audio or video. This phase is referred to as the start-up phase. After this, the client begins playback of the buffered multimedia content.

The quality and resolution of the multimedia playback at the client device is dependent on the available link bandwidth. The video client typically estimates the available link bandwidth based only on higher layer throughput estimates, such as HTTP-level video streaming throughput, or on transmission control protocol (TCP) throughput. Such an approach has limitations in tracking rapid variations in channel conditions which occur in wireless networks. These limitations in tracking the variations can limit the ability of rate adaptation algorithms to adapt to variations in link conditions. In addition, the use of higher layer throughput estimates to estimate available link bandwidth is not available before the first few video frames are received.

In accordance with one embodiment of the present invention, a better estimate of the available bandwidth can be provided for HAS in a wireless network by using a physical layer aware video adaptation approach for HAS systems, such as systems configured to use the dynamic adaptive streaming over HTTP (DASH) standard. This approach is especially suited for wireless links whose characteristics fluctuate with time, depending on the physical environment as well as on the load on the system.

In one embodiment, the available link bandwidth information can be estimated based on physical layer throughput information as a complement to higher layer estimates at the transport or application layers. In a cellular scenario such information is provided by the radio of the User Equipment (UE) to the video adaptation module of a HAS client.

The use of link bandwidth information can be used as an optional feature in HAS, wherein PHY layer throughput can be used for video rate adaptation only when certain conditions regarding link condition, buffer status, or other desired criteria are met. For example, PHY layer throughput can be used when a good estimate of the higher layer throughputs is unavailable. Higher layer throughput estimates can be limited in accuracy at the beginning of the streaming session. Also PHY layer throughput can be used when wireless channel conditions are varying relatively rapidly. A threshold can be set to determine the amount of variation in the wireless channel conditions that causes the physical layer goodput measurement to be used in place of the higher layer throughput estimate. The threshold level can vary based on system design and use. In one embodiment, if the higher layer throughput estimate reduces the actual throughput of a number of video frames of the HAS by more than a selected percentage relative to the use of the physical layer goodput, then the physical layer goodput can be used. The threshold may vary from a small percentage, such as 0.1 percent, to a relatively high percentage, such as 20 percent or more, depending on the type of system in which the wireless device operates.

When there are frequent changes in channel conditions, such as when a wireless device is moving, the higher layer throughput estimates are late in following the change in wireless link conditions. Rapid wireless channel variations can be inferred by observing the trend of the physical layer throughput over time. The ability to use the physical layer throughput estimates enables a multimedia player to opportunistically adapt to channel fluctuations and improve user Quality of Experience (QoE) by addressing key performance metrics of re-buffering percentage and user video quality.

In one embodiment, the use of video rate-adaptation algorithms that opportunistically adapt the video rate based on physical layer link conditions and buffer status can be used to improve startup video quality under tolerable startup delay and to reduce re-buffering during video playback. Accordingly, the QoE for the user can be significantly improved. This will be discussed further in the proceeding paragraphs.

Wireless Multimedia Standards

There have been a number of multimedia standards that have been developed to enable multimedia to be communicated to, from, or between mobile computing devices. For instance, in streaming video, the third generation partnership project (3GPP) has developed technical specification (TS) 26.234 (e.g. Release 11.0.0) that describes packet-switched streaming services (PSS) that are based on the real-time streaming protocol (RTSP) for unicast streaming of on-demand or live content. In addition, hyper-text transfer protocol (HTTP) based streaming services, including progressive download and dynamic adaptive streaming over HTTP (DASH), are described in 3GPP TS 26.247 (e.g. Release 11.0.0). 3GPP-based multimedia broadcast and multicast services (MBMS) specification TS 26.346 (e.g. Release 11.0.0) specifies streaming and download techniques for multicast/broadcast content distribution. As such, DASH/PSS/MBMS-based mobile computing devices, such as user equipment (UEs), decode and render streamed videos at the UE devices. Support for the 3GP file format in 3GPP TS 26.244 (e.g. Release 11.0.0) is mandated in all of these specifications to support file download and HTTP-based streaming use cases.

One example of a standard for conversational video communication, such as video conferencing, is provided in 3GPP TS 26.114 (e.g. 11.0.0). The standard describes the multimedia telephony services over IMS (MTSI) that allows delivery of advanced multimedia conversational services and content over internet protocol (IP) multimedia subsystems (IMS) based networks. IMS is standardized in 3GPP TS 26.140 (e.g. Rel. 11.0.0). An MTSI-based transmitter UE terminal can capture and record video, and then transfer the video to an MTSI-based receiver UE terminal over a 3GPP network. The receiver UE terminal can then decode and render the video. The 3GPP TS 26.140 also enables video sharing using multimedia sharing services (MMS), in which support for the 3GP file format is provided.

The standards described above are provided as examples of wireless multimedia standards that can be used to communicate multimedia files to, from, and/or between multimedia devices. The examples are not intended to be limiting. Additional standards may be used to provide streaming video, conversational video, or video sharing.

Streaming Media Standards

A more detailed explanation of HTTP streaming, and more particularly, the DASH standard is provided herein, in context with embodiments of the present invention. The detailed explanation is not intended to be limiting. As will be further explained in the proceeding paragraphs, the embodiments of the present invention can be used to efficiently communicate multimedia to, from, and/or between mobile devices by enabling the mobile devices, or the servers in communication with the mobile devices, to select and/or communicate multimedia having a desired energy characterization. The multimedia can be communicated using a standardized or non-standardized communication scheme.

Hypertext transfer protocol (HTTP) streaming can be used as a form of multimedia delivery of Internet video. In HTTP streaming, a multimedia file can be partitioned into one or more segments and delivered to a client using the HTTP protocol. HTTP-based delivery can provide reliability and deployment simplicity due to a broad adoption of both HTTP and HTTP's underlying protocols, including transmission control protocol (TCP)/internet protocol (IP). HTTP-based delivery can enable simplified streaming services by avoiding network address translation (NAT) and firewall traversal issues. HTTP-based delivery or streaming can also provide the ability to use standard HTTP servers and caches instead of specialized streaming servers. HTTP-based delivery can provide scalability due to minimal or reduced state information on a server side. Examples of HTTP streaming technologies can include Microsoft IIS Smooth Streaming, Apple HTTP Live Streaming, and Adobe HTTP Dynamic Streaming.

DASH is a standardized HTTP streaming protocol. As illustrated in FIG. 1, DASH can specify different formats for a media presentation description (MPD) metadata file 102 that provides information on the structure and different versions of the media content representations stored in the server as well as the segment formats. The MPD metadata file contains information on the initialization and media segments for a media player (e.g., the media player can look at initialization segment to determine a container format and media timing information) to ensure mapping of segments into a media presentation timeline for switching and synchronous presentation with other representations. DASH technology has also been standardized by other organizations, such as the Moving Picture Experts Group (MPEG), Open IPTV Forum (OIPF), and Hybrid Broadcast Broadband TV (HbbTV).

A DASH client can receive multimedia content by downloading the segments through a series of HTTP request-response transactions. DASH can provide the ability to dynamically switch between different bit rate representations of the media content as the bandwidth that is available to a mobile device changes. Thus, DASH can allow for fast adaptation to changing network and wireless link conditions, user preferences and device capabilities, such as display resolution, the type of central processing unit (CPU) employed, the memory resources available, and so forth. The dynamic adaptation of DASH can provide a better quality of experience (QoE) for a user, with shorter startup delays and fewer rebuffering events than other streaming protocols.

Figure 2:
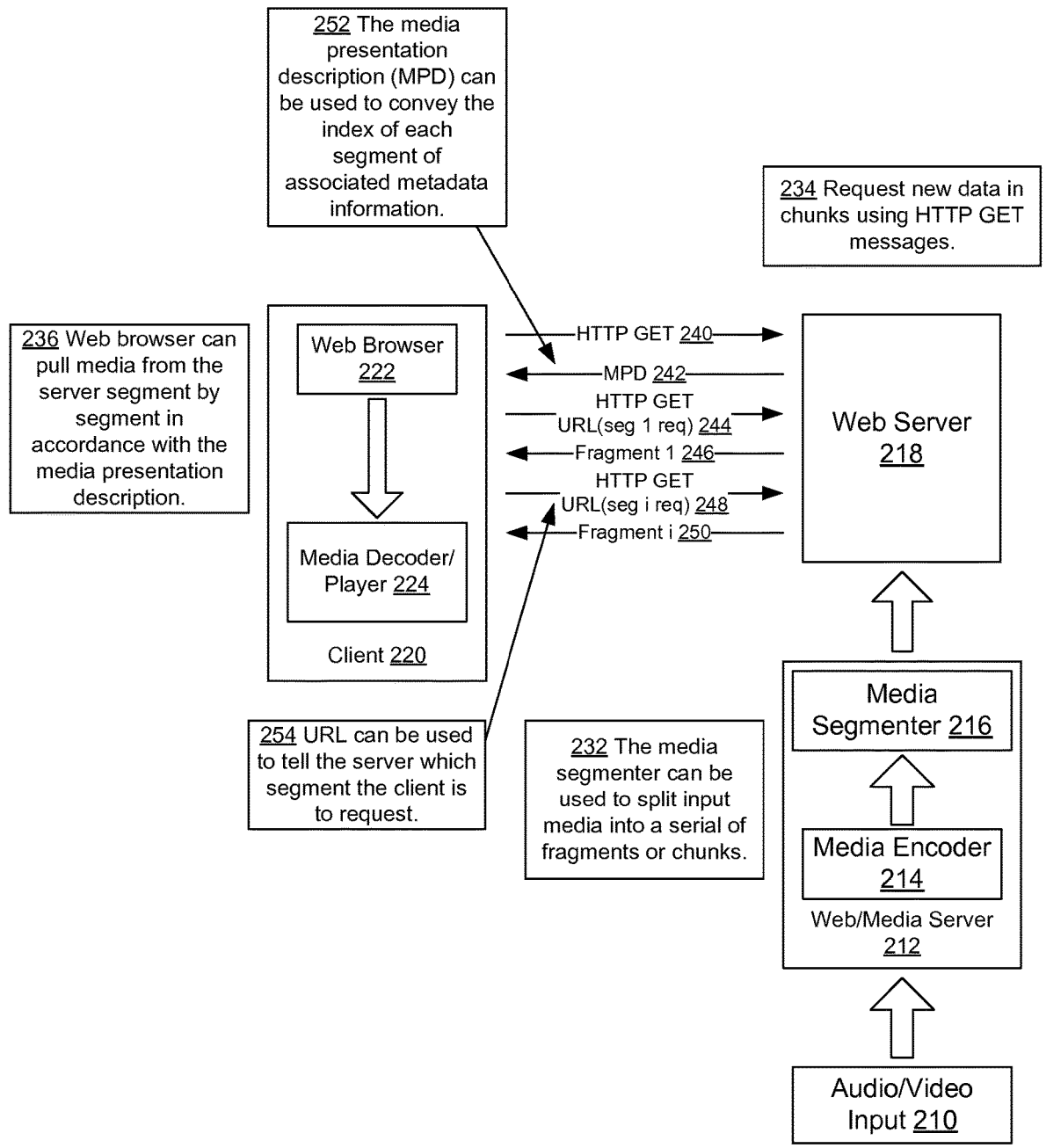
FIG. 2 illustrates a block diagram of hypertext transfer protocol (HTTP) streaming in accordance with an example.

In DASH, a media presentation description (MPD) metadata 102 can provide information on the structure and different versions of the media content representations stored in a web/media server 212, as illustrated in FIG. 2. In the example illustrated in FIG. 1, the MPD metadata is temporally divided into periods having a predetermined length, such as 60 seconds in this example. Each period can include a plurality of adaptation sets 104. Each adaptation set can provide information about one or more media components with a number of encoded alternatives. For example, adaptation set 0 in this example might include a variety of differently encoded audio alternatives, such as different bit rates, mono, stereo, surround sound, and so forth. In addition to offering different quality audio for a multimedia presentation over the period ID, the adaptation set may also include audio in different languages. The different alternatives offered in the adaptation set are referred to as representations 106.

In FIG. 1, Adaptation set 1 is illustrated as offering video at different bitrates, such as 5 mega-bits per second (Mbps), 2 Mbps, 500 kilo-bits per second (kbps), or a trick mode. The trick mode can be used for seeking, fast forwarding, rewinding, or other changes in location in the multimedia streaming file. In addition, the video may also be available in different formats, such as two dimensional (2D) or three dimensional (3D) video. Each representation 106 can include segment information 108. The segment information can include initialization information 110 and the actual media segment data 112. In this example, an MPEG 4 (MP4) file is streamed from a server to a mobile device. While MP4 is used in this example, a wide variety of different codecs may be used, as previously discussed.

The multimedia in the adaptation set can be further divided into smaller segments. In the example of FIG. 1, the 60 second video segment of adaptation set 1 is further divided into four sub-segments 112 of 15 seconds each. These examples are not intended to be limiting. The actual length of the adaptation set and each media segment or sub-segment is dependent on the type of media, system requirements, potential types of interference, and so forth. The actual media segments or sub-segments may have a length that is less than one second to several minutes long.

As shown in FIG. 2, the MPD metadata information can be communicated to a client 220, such as a mobile device. A mobile device can be a wireless device configured to receive and display streaming media. In one embodiment, the mobile device may only perform part of this function, such as receiving the streaming media and then communicating it to another device or a display device for rendering. The mobile device can be configured to run a client 220. The client can request the segments using an HTTP GET 240 message or a series of partial GET messages. The client can control the streaming session, such as managing an on-time request and smooth play-out of a sequence of segments, or potentially adjusting bitrates or other attributes, to react to changes of a wireless link, a device state or a user preference.

FIG. 2 illustrates a DASH-based streaming framework. A media encoder 214 in the web/media server 212 can encode an input media from an audio/video input 210 into a format for storage or streaming A media segmenter 216 can be used to split the input media into a series of segments 232, which can be provided to a web server 218. The client 220 can request new data in segments using HTTP GET messages 234 sent to the web server (e.g., HTTP server).

For example, a web browser 222 of the client 220 can request multimedia content using a HTTP GET message 240. The web server 218 can provide the client with a MPD 242 for the multimedia content. The MPD can be used to convey the index of each segment and the segment's corresponding locations as shown in the associated metadata information 252. The web browser can pull media from the server segment by segment in accordance with the MPD 242 as shown in 236. For instance, the web browser can request a first segment using a HTTP GET URL (frag 1 req) 244. A uniform resource locator (URL) or universal resource locator can be used to tell the web server which segments the client is to request 254. The web server can provide the first fragment (i.e., segment 1 246). For subsequent segments, the web browser can request a segment i using a HTTP GET URL (frag i req) 248, where i is an integer index of the segment. As a result, the web server can provide a segment i 250. The segments can be presented to the client via a media decoder/player 224.

Figure 3:
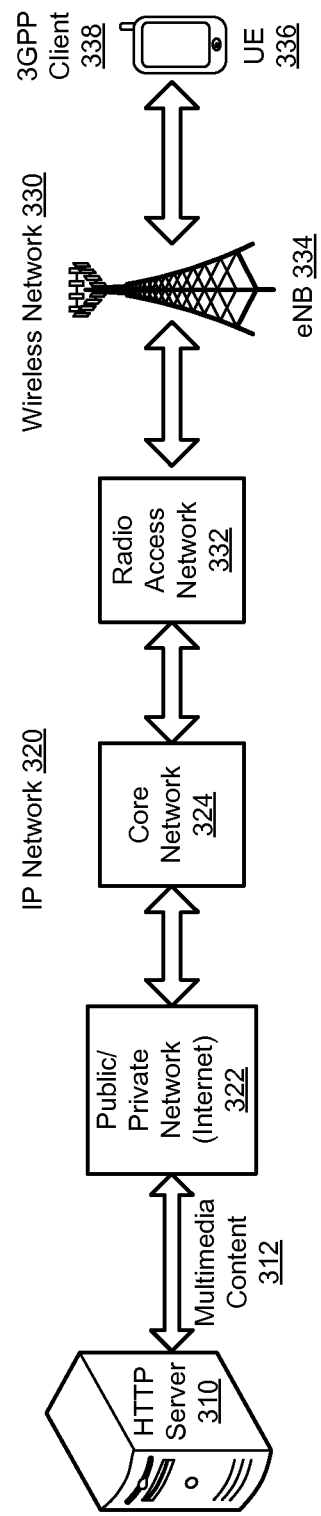
FIG. 3 illustrates a block diagram of a radio access network (RAN) architecture for hypertext transfer protocol-based (HTTP-based) link aware adaptive streaming in accordance with an example.

FIG. 3 illustrates a flow of multimedia content 312 between an HTTP server 310 providing the multimedia content to a 3GPP client 338 operating on a mobile device, such as a UE 336. The HTTP server can interface with a public or private network 322 (or the Internet) in communication with a core network 324 of a wireless wide area network (WWAN). In one embodiment, the WWAN can be a 3GPP LTE based network or an IEEE 802.16 based network (i.e. 802.16-2009). The core network can access a wireless network 330, such as an evolved packet system (EPS) via a radio access network (RAN) 332. The RAN can provide the multimedia content to the client operating on the UE via a node (e.g., an evolved Node B (eNB) 334).

Link Aware Streaming Adaptation

In accordance with one embodiment, a system with multiple wireless video users being served by a base-station is disclosed. Although the system contains multiple video clients, each client can act independently of other clients. The different representations of a video requested by a representative client can be indexed using letter k. The value k=1 can be set to represent the lowest bitrate representation level and k=N can represents the highest representation level. The variable $b_k$ can represent the bitrate of encoded video of representation level k, where $b_1 \leq b_2 \leq b_3 \leq \ldots \leq b_N$.

The rates of different video representation levels in an MPD can be communicated to the client by the server in the MPD. This takes place prior to the commencement of the streaming of multimedia. The play out process and rate adaptation can take place in time granularity of video frame duration τ. Video frame duration τ is the reciprocal of the video frame rate $F_r$, i.e., $\tau=1/F_r$. A certain video frame duration is called a frameslot. Each frameslot can be indexed using the letter i.

Physical Layer Goodput

To enable the video rate adaptation algorithm to opportunistically adapt to the fluctuations of the radio link throughput, an estimate of the physical layer goodput can be performed and used for video rate adaptation. Goodput is the application level throughput. The throughput is the number of useful information bits delivered by the network to a certain destination, such as a UE, per unit of time. The throughput data excludes protocol overhead bits as well as retransmitted data packets.

If $X_i$ is the number of successfully received bits in the $i^{th}$ video frameslot, the physical layer goodput in the $i^{th}$ frameslot is given by:

$$R_i^{PHY} = \frac{X_i}{\tau}$$

The average physical goodput in the $i^{th}$ frameslot is the average of the physical layer goodput over the past T frameslots i.e., $$R_i^{PHY-Avg} = \frac{1}{T}\sum_{t=0}^{T-1} R_{i-t}^{PHY}$$

The estimation of the average physical layer goodput can use collaboration with the physical layer of a radio link to determine the number of successfully downloaded bits in each frameslot. Since only successfully received bits are used to determine the physical layer goodput, the effect of Hybrid automatic repeat requests (HARQ) and TCP layer re-transmissions on the throughput estimate is accounted for in the physical layer goodput estimate. Further, the physical layer goodput in a frameslot is closely related to the evolution of the video client and server buffers.

Throughput Measurement Using Higher Layers

Traditionally, higher layer throughput estimates at the TCP or application layers have been used for estimating the available link bandwidth for video rate adaptation in a HAS. Examples of higher layer throughput estimates are provided in the proceeding paragraphs.

Average Video Fragment Throughput

Average video fragment is the average throughput experienced while downloading video fragments, as illustrated in the following equation:

$$R_i^{Fragment} = \frac{1}{F}\sum_{j=L_F-F+1}^{L_F} \frac{S_{frag}(j)}{T_{dwnd}^{frag}(j) - T_{fetch}^{frag}(i)}$$

where $S_{frag}(j)$, $T_{download}^{frag}(j)$ and $T_{fetch}^{frag}(i)$ are the size, download time and fetch time of the $j^{th}$ video fragment requested, respectively. The variable $L_F$ is the most recent fragment requested, and F is the number of segments used for averaging. This is a conservative estimate of the bandwidth. Because this throughput estimate involves averaging over fragments, the estimate may not track the variations in the wireless link bandwidth with time. In addition, the average video fragment throughput is not available until after the first few video fragments are downloaded.

TCP Throughput

Another higher layer approach is to use the TCP estimate of the available link bandwidth which is given by:

$$R_i^{TCP} = \frac{Cwnd}{RTT},$$

where Cwnd is the so-called TCP congestion window and RTT is a signal's estimated round trip time. The variable Cwnd is the TCP's current estimate of the available link bandwidth. Typically Cwnd is increased upon reception of acknowledgements (ACKS) as it is an indication that the network can support a higher bandwidth and it is decreased when it perceives losses (perceived through timeout or duplicate ACKs) as it assumes that losses are due to congestion. There is a slow-start phase in which the Cwnd is increased exponentially upon reception of acknowledgements and there is a congestion avoidance phase in which it is increased linearly upon acknowledgements.

However TCP was designed for wired networks and for bulk applications that continuously send data. It was neither designed for wireless networks nor for application rate-limited applications like HTTP adaptive streaming. The use of TCP to estimate throughput has at least two problems. First, the use of the TCP estimation assumes that wireless losses are also congestion. This assumption unnecessarily decreases the window size even when the actual throughput does not require the decrease. Secondly, the TCP estimation unnecessarily increases the Cwnd even during application rate limited cases. Thus the Cwnd bandwidth estimate can become much higher than the number of TCP packets that the application sends within an RTT period. When the application sends fewer packets than allowed by the Cwnd bandwidth estimate, the TCP is unable to probe the available network bandwidth properly. Thus the Cwnd bandwidth estimate no longer reflects the current available network bandwidth. For these reasons, the use of a TCP based bandwidth estimate is not very appropriate for use in rate-adaptation in HAS over wireless scenarios.

Advantages of Link Layer Goodput

In accordance with one embodiment, link layer goodput can be used as a complement to higher layer estimates. Link layer goodput can track link throughput variations over time, thereby providing a higher scope for opportunistic video rate adaptation and buffer build up to improve the QoE of the user. The use of the link layer represents the actual current goodput that is obtained by the user, unlike higher layer estimates which can be outdated. The link layer goodput can change dramatically in relatively short periods of time.

However, the link layer goodput can be averaged over time to present a smooth estimate, thereby avoiding drastic variations, while still capturing the overall trend of the wireless link. Further, the use of link layer goodput avoids some of the disadvantages that a TCP-based bandwidth estimate has for rate-limited applications over wireless channels. Also link layer goodput is available from the first video segment of the streaming session rather than after the download of the first few video segments.

Accordingly, link layer goodput can provide quicker, more accurate knowledge of the actual throughput in a HTTP adaptive stream. This knowledge can then be used to proactively download additional frames to build the buffer when additional bandwidth is available due to changes in the wireless link. In addition, an accurate knowledge of the goodput at the beginning of a HAS session enables quicker startup and better display resolution.

Selected Throughout

In one embodiment, the average link layer goodput can be used in conjunction with higher layer throughputs like video fragment throughput. The throughput that is selected for video rate adaptation can be based on the evolution of changes in wireless link conditions as well as on the buffer level of the HAS client. The selected throughput used for rate adaptation by a representative user in frame slot i can be denoted by $R_i^{Sel}$. In one embodiment, a conservative estimate can be determined based on PHY goodput and segment throughput as follows:

$$R_i^{Sel} = \begin{cases} R_i^{phy} & \text{if } R_i^{seg} > (1+\beta)R_i^{phy} \\ R_i^{seg} & \text{otherwise} \end{cases},$$

where the constant $\beta$ prevents short term variations in link conditions from changing the rate adaptation. This conservative method can be used in the steady state because typically PHY goodput responds quickly to wireless link variations, while segment throughput responds much more slowly to link variations.

In the startup phase of a HAS session, the relationship $R_i^{Sel} = \chi R_i^{phy}$ may be used for obtaining better video quality. The variable $\chi$ is less than or equal to one and is a scaling factor that can be used to obtain a design tradeoff between startup video quality and startup delay. The value of $\chi$ can be set based on user QoE preferences. These are only representative examples and other generalized conditions based on client buffer state and link conditions can be used to determine the selected throughput for HAS video rate adaptation.

Buffer Evolution and Tracking

In order to request the appropriate representation level, the client can keep track of the frames requested, received, buffered and played back. FIG. 3 shows the frame tracking done by the UE client. $N_i$ and $Q_i$ respectively represent the number of frames and the representation level requested in frameslot i i.e., at the end of each frameslot i the client requests the server $N_i$ frames at representation level $Q_i$ as determined by the rate adaptation algorithm. The client decided on $N_i$ and $Q_i$ based on the physical layer goodput as well as the various frame levels.

Figure 4:
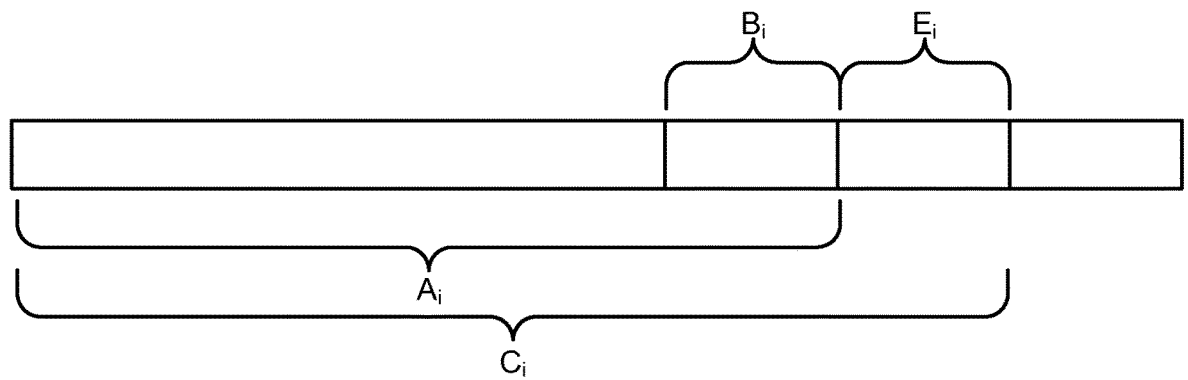
FIG. 4 illustrates a diagram of frame levels used by a client to compute a number of frames and representation level in accordance with an example.

FIG. 4 provides an example illustration of video frame tracking. The variables $A_i$, $B_i$, $C_i$, and $E_i$ represent the various frame levels that the client uses in computing $N_i$ and $Q_i$. The variable $A_i$ represents the total number of video frames received by the client before the client makes its request in frameslot i. The variable $B_i$ represents the number of frames in the client buffer that are available for playback and $C_i$ represents the number of frames requested by the client:

$$C_i = \sum_{j=1}^{i-1} N_j.$$

The variable $E_i$ represents the number of video frames requested, but not received, by the client. The client can estimate $E_i$ based on the total requested and received frames. For instance:

$$E_i = C_i - A_i.$$

The buffer evolution is closely related to the PHY goodput experienced by the user. Let $b_{i,k}$ represent the rate of the video representation level downloaded in frameslot i. Then the number of frames that enter the client buffer in frameslot i is:

$$\beta_i = \frac{R_i}{b_{i,k}},$$

where $\beta i$ is the ratio of the goodput at the link layer to the rate of the video representation level. It represents the rate at which the client buffer is being filled.

Client States

Figure 5:
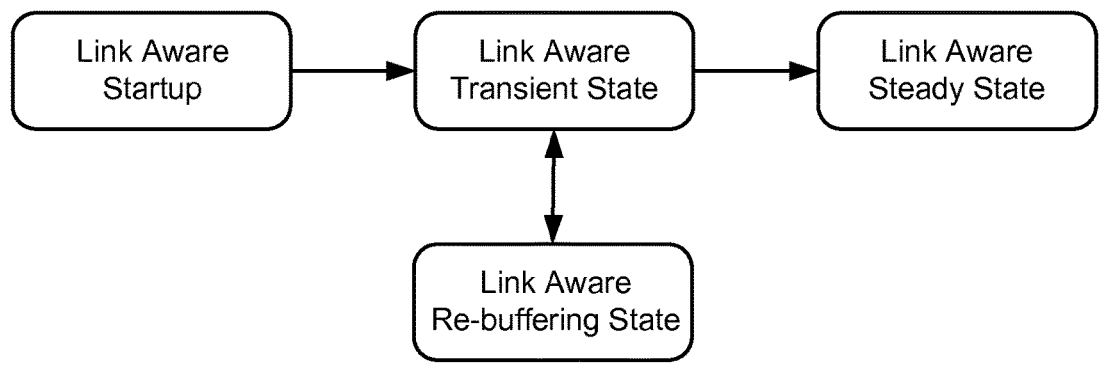
FIG. 5 illustrates a diagram of link aware adaptive streaming client player states in accordance with an example.

1. The central intelligence in HTTP Adaptive Streaming (HAS) resides in the client rather than the server. The adaptation level of the video segment to be downloaded is determined by the client and communicated to the server periodically within the adaptive streaming session. Based on the frame levels, the operation of the client player in our link-aware adaptive streaming framework can be characterized into four modes or states, as illustrated in FIG. 5: i) Startup; ii) a Transient State; iii) a Steady State; or iv) a Re-buffering State.

2. The startup mode represents the initial buffering mode, during which the client buffers video frames to a certain limit before beginning to playback the video or audio delivered by HAS. The steady state represents the state in which the UE buffer level is above a certain threshold. The transient state is the state in which the UE buffer level falls below a certain limit after beginning to playback. The re-buffering state is the state that the client enters when the buffer level becomes zero after beginning to playback and it remains in that state until it rebuilds its buffer level to a satisfactory level to begin playback again. It should be noted that the client does not playback the multimedia only during startup and re-buffering modes.

3. A state variable $S_i$ can be used to denote the state of the client as determined in the $i^{th}$ frameslot. The values assigned to $S_i$ correspond to different states are as follows:

4.

$S_i=-1$ for Startup state
$S_i=0$ for Re-buffering state
$S_i=1$ for Transient state
$S_i=2$ for Steady State.

5. In one embodiment, the client state can be set depending on the received number of frames $A_i$ and the number of frames available for playback in the UE buffer $B_i$ using the following algorithm:

```
If (A_i ≤ A_thresh^StartUp )
    Si = -1 //Startup state
    else if (Bi = 0 )
        Si = 0 // Re-buffering State
    else if ( (Si-1=0) and B_i ≤ B_thresh^Re buff )
        Si = 0 // Re-buffering State
    else if ( B_i < B_thresh^Steady )
        Si = 1 //Transient state
    else if ( B_i ≥ B_thresh^Steady )
        Si = 2 // Steady State
end
```

Defining these different states allows rate adaptation to be designed not only based on the physical layer goodput, but also on the state of the user client.

MBR/GBR Signaling

The network can also signal Quality of Service (QoS) parameters in the form of a Maximum Bit Rate (MBR) and a Guaranteed Bit Rate (GBR) to the UE when a QoS bearer is established or modified in a QoS-aware network, such as 3GPP LTE. The HAS client can use this information in conjunction with different throughput estimates for choosing the representation level of the video segments that the client request from the HAS server. The MBR can be used by the HAS client to limit the maximum video representation level it can choose and the GBR can be used by the HAS client to at least choose a representation level whose media bit rate is greater than the GBR signaled by the network. The best video representation is selected as follows based on the selected throughput and the signaled MBR/GBR as follows:

$$Q_i^{sup} = \operatorname*{argmax}_k b_k;$$
$$\text{s.t. } b_k \leq \max(GBR, \min(R_i^{Sel}, MBR)); k = 1, 2, \ldots, N$$

Link-Aware Rate Adaptation Framework

Figure 6:
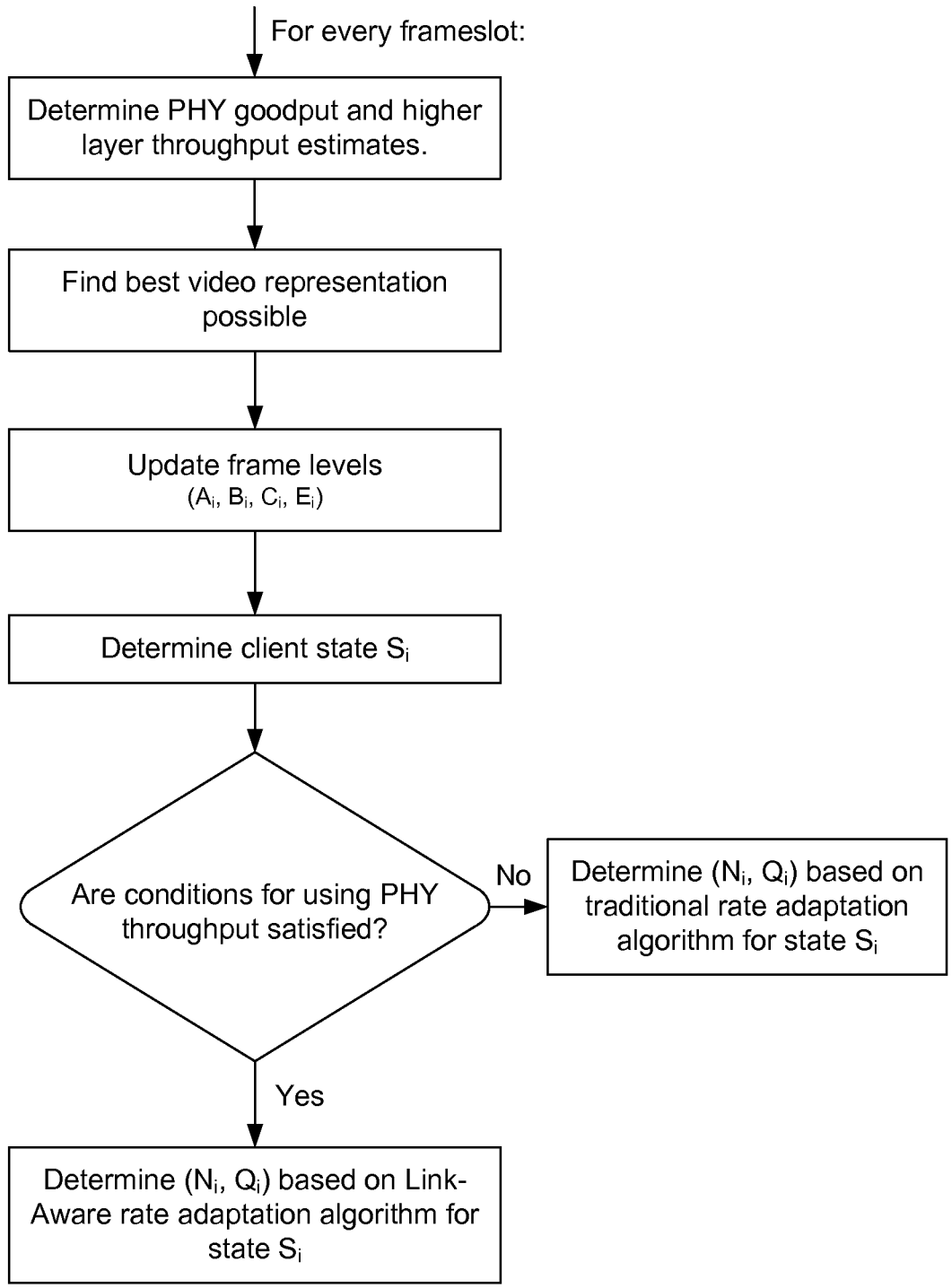
FIG. 6 illustrates a link aware rate adaptation flow chart in accordance with an example.

In accordance with one embodiment, the client operating on a wireless device can determine the number of frames $N_i$ and the video representation level $Q_i$ in every frameslot i. One example of a link aware rate adaptation algorithm is illustrated in the flowchart of FIG. 6.

Link Aware Video Rate Adaptation Framework: For Every Frameslot i

1) The average PHY goodput $R_i^{PHY-Avg}$ in frameslot i is determined based on cross-layer collaboration in addition to any higher layer estimates available.
2) Frame levels $A_i$, $B_i$, $C_i$, and $E_i$ are updated
3) The best video representation level possible $Q_i^{sup}$ is selected based on the video fragment throughput, estimated PHY layer goodput, and MBR/GBR signaled as follows:

$$Q_i^{sup} = \operatorname*{argmax}_k b_k;$$
$$\text{s.t. } b_k \leq \max(GBR, \min(R_i^{Sel}, MBR)); k = 1, 2, \ldots, N$$

4) Then the state $S_i$ of the client is determined based on monitoring the frame levels
5) The ($N_i$, $Q_i$) pair representing the number of frames $N_i$ and the representation level $Q_i$ is determined based on the particular algorithm used in that particular client state Startup Rate Adaptation The startup mode represents the initial buffering mode where the client buffers frames to a certain threshold of playback time before playback starts. The startup mode starts at the beginning of the streaming session after the MPD phase and continues until the total number of received frames exceeds a certain threshold i.e., until the following condition is satisfied:

$$A_i \leq A_{thresh}^{StartUp} = \operatorname{ceil}(t_{thresh}^{StartUp} \cdot \tau)$$

In link unaware options, the first video segment is always requested at the lowest representation level so that the client can get a quick estimate of the physical layer goodput for the next frameslot i.e., $N_1 = S_{seg}$, and $Q_i = 1$. This requirement can be relaxed if the client has an estimate of the physical layer goodput before beginning the HAS session, thereby allowing multimedia to be displayed at startup with a higher quality.

Following are several embodiments for link adaptation in the Start Up mode. The startup mode is the mode until a selected number of video frames in the HAS have been received. The actual value can depend on system design, network operation, or other desired parameters.

Basic/Traditional Startup Rate Adaptation

In this embodiment, a fixed chunk of $S_{seg}$ frames (equivalent to 1 segment) can be requested at the end of each frameslot:

$$\left. \begin{array}{l} Q_i = 1 \\ N_i = S_{seg} \end{array} \right\} \forall i \text{ s.t. } A_i \leq A_{thresh}^{StartUp}.$$

Quality-Optimized Startup (Qual Opt)

In this embodiment, the quality of the video is optimized if the link conditions permit so. An incremental quality approach can be used, wherein the next available video adaptation rate is chosen if enough bandwidth is available to support such a rate. For this purpose the ratio $\delta_i$ is defined as follows:

$$\delta_i = \frac{R_i^{PHY-Avg}}{b_{\min(Q_{i-1}+1, Q_i^{sup})}}.$$

This ratio represents the ratio of the average estimated physical layer throughput to the next video representation level that is possible. The ($N_i$, $Q_i$) pair for this option is then selected as follows:

$$\left. \begin{array}{l} Q_i = \min(Q_{i-1}+1, Q_i^{sup}) \text{ if } (\delta_i \geq (1+\alpha)) \\ Q_i = \min(Q_{i-1}, Q_i^{sup}) \quad \text{otherwise} \\ N_i = S_{seg} \end{array} \right\} \text{s.t. } A_i \leq A_{thresh}^{StartUp}.$$

Delay Optimized Startup

In this embodiment, the startup delay is minimized while keeping the video quality at the lowest representation level:

$$\left. \begin{array}{l} Q_i = 1 \\ N_i = N_{i-1} + S_{seg} \text{ if } (\beta_i \geq (1+\alpha)) \\ N_i = \max(N_{i-1} - S_{seg}, S_{seg}) \text{ Otherwise} \end{array} \right\} \text{s.t. } A_i \leq A_{thresh}^{StartUp}$$

Delay Bounded Quality Optimization

In this option, the video quality is optimized subject to a constraint on delay. A target time $T_{thresh}^{StartUp}$ is set. During the target time, the startup phase is to be completed by downloading all of the frames required for startup. Within this constraint, an attempt is made to optimize the video quality during the startup phase. The algorithm can be summarized using the flowchart in FIG. 7. Details of the algorithm can be summarized as follows:

Delay Bounded Quality Optimization: In Every Frameslot i
1. Determine the minimum required frame download rate:

$$F_i^{min} = \frac{\text{\# Frames Required}}{\text{Time Available}} = \frac{B_{thresh}^{StartUp} - B_i}{\max(T_{thresh}^{StartUp} - i \cdot \tau, \tau)},$$

where $B_i$ is the current buffer level in terms of video frames and $B_{thresh}^{StartUp}$ is the threshold number of frames required in the buffer to start playback.

2. Compute the frame download rate for all video representation level under current link conditions. The frame download rate for video representation level with rate $b_k$ is given by:

$$f_k = \frac{R_i^{PHY-Avg}}{b_k \cdot \tau}$$

Note that the frame download for a representation level is directly proportion to the PHY goodput and inversely proportional to the rate of the video representation level.

3. Select the best video representation level such that $f_k \geq F_i^{min}$ in i.e., $$Q_i = \arg\max_k b_k; f_k \leq F_i^{min} \text{ over } k = 1, 2, \ldots, N$$

$$N_i = 1$$

Figure 7:
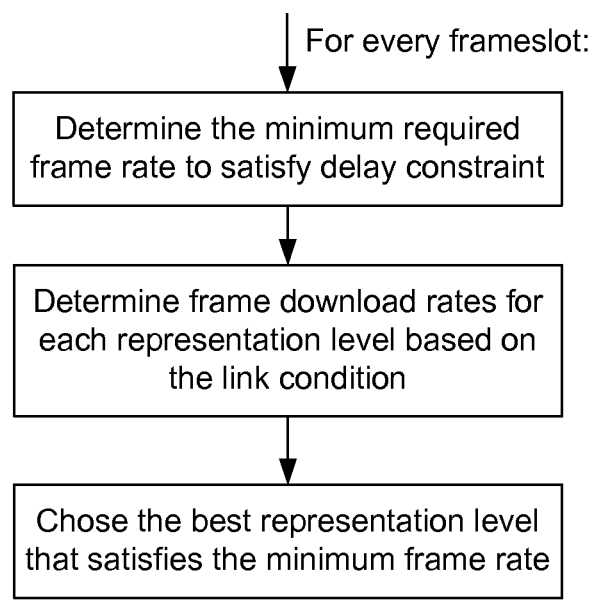
FIG. 7 depicts a delay bounded quality optimized startup flowchart in accordance with an example.

FIG. 7 provides a flow chart illustrating a delay bounded quality optimized startup. For each frameslot, the minimum required frame rate can be determined to satisfy a delay constraint. The frame download rates can then be determined for each representation level based on the link condition. The best representation level can be chosen that satisfies the minimum threshold. The threshold $B_{thresh}^{StartUp}$ and $T_{thresh}^{StartUp}$ can be adjusted to obtain a tradeoff between video quality and start-up (buffering) delay.

Steady State Rate Adaptation (Link Aware)

Basic/Traditional Steady State Rate Adaptation

In the steady state mode, the buffer level at the client is above a certain level. In the traditional steady state algorithm, the objective is to maintain the buffer level without compromising video quality. This is typically done by periodically requesting one segment worth of frames for each segment duration in the steady state. For this purpose, a state variable $t_{Steady}$ is maintained that indicates the time in steady state in terms of a number of frameslots in current steady state invocation since a last segment transmission. The state variable $t_{Steady}$ is initialized to zero in the first frameslot when entering the steady state from any other state. The variable $t_{Steady}$ is then incremented as follows for subsequent frameslots in steady state:

$$t_{Steady} = \mod(t_{Steady} + 1, S_{seg}),$$

where $S_{seg}$ is the number of frames in a video segment and also represents the number of frameslots in a segment duration.

In the basic steady state algorithm, $(N_i, Q_i)$ pair for frameslot i is determined as follows:

$Q_i = Q_i^{sup}$,
$N_i = S_{seg}$ if $t_{Steady} = 0$
$N_i = 0$ if $t_{Steady} \neq 0$

Link Aware Steady State

In accordance with one embodiment, a link-aware steady state mode is disclosed, in which the client probes the link looking for additional bandwidth to download video frames faster without compromising the quality. The additional bandwidth available is determined by the ratio of the average physical layer throughput $R_i^{PHY-Avg}$ to the chosen representation level $Q_i^{sup}$ i.e., $$\gamma_i = \frac{R_i^{PHY-Avg}}{b_{Q_i^{sup}}}.$$

If additional link bandwidth is available, more than one segment can be requested per segment duration so that the buffer can be built up to avoid future re-buffering. To accomplish this, $\gamma_i$ can be set to exceeds a certain threshold i.e., $$\gamma_i \geq 1 + \alpha,$$

where round $(\gamma_i)$ represents the potential number of segments that can be downloaded in the next frameslot with the present adaptation rate and link conditions. At the same time, if a greater number of segments are requested and wireless link conditions change for the worse, then the video rate adaptation is redundant. Accordingly, additional conditions can be set for requesting additional video segments during steady state. First, the link throughput can be determined to be in an increasing phase and not in a decreasing phase:

$$R_i^{PHY-Avg} \geq R_{i-1}^{PHY-Avg}.$$

Second, an option can be provided to place a limit on the total number of video frames requested that are not yet received, i.e., we can limit $E_i$ so that we do not request too many video segments without receiving them i.e., $$N_i + E_i \leq E_{max},$$

where $E_{max}$ represents an upper limit that is set on $E_i$.

The $(N_i, Q_i)$ pair requested at the end of frameslot i in the link-aware steady state can be determined as follows:

---

Link Aware Steady State Algorithm

```
Qi = Qi^sup  // the best quality possible can be chosen in the steady state
   if (Si-1 ~= 2 ) //if previous state is not steady state
       Ni = min(Emax - Ei , Sseg )
       tSteady = 0
   else if (Si-1 == 2 ) //if previous frameslot state is also steady state
       tSteady = mod(tSteady+1,Sseg)
       if (tSteady == 0)
           if ( ( Ri^PHY-Avg ≥ Ri-1^PHY-Avg ) and (γi ≥ 1 + α) )
               Ni = min( Emax - Ei , round(γi) Sseg )
           else
               Ni = min(Emax - Ei , Sseg )
       end
   else
       Ni = 0
   end
end
```

Adaptation in Link Aware Transient and Re-Buff States

Transient and re-buffering states represent states where the client buffer level is low. The aim is to build the buffer level until the client is operating in the steady state. Accordingly, the same concepts used for start-up rate adaptation can be used with different thresholds on frame levels and delay requirements to accomplish desired transient and re-buffering states. The use of the physical layer goodput information can enable more accurate requests from the mobile device to the web server for video segments. The greater accuracy of the actual link level throughput provided by the physical layer goodput information can enable the client buffer to be filled to a desired level more quickly than may be possible with only higher layer throughput information.

HTTP Adaptive Streaming Device

Figure 8:
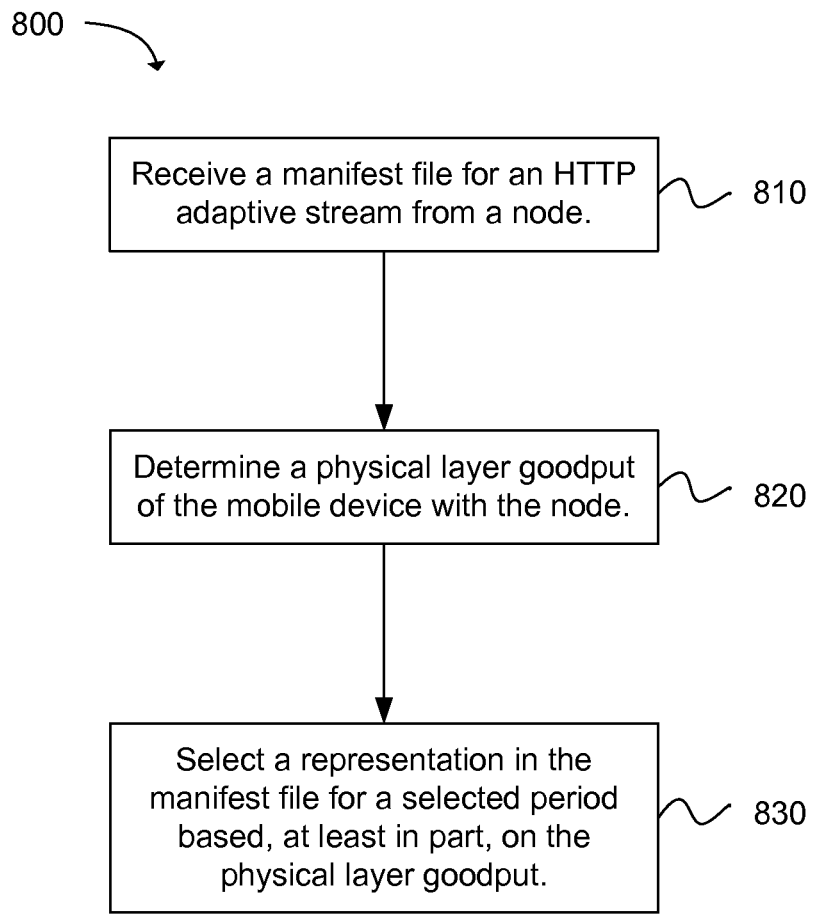
FIG. 8 depicts functionality of computer circuitry of a mobile device operable to receive hyper-text transfer protocol (HTTP) adaptive streaming (HAS), in accordance with an example.

1. Another example provides functionality 800 of computer circuitry of a mobile device operable to receive hypertext transfer protocol (HTTP) adaptive streaming (HAS), as shown in the flow chart in FIG. 8. The functionality may be implemented as a method or the functionality may be executed as instructions on a machine, where the instructions are included on at least one computer readable medium or one non-transitory machine readable storage medium. The computer circuitry can be configured to receive a manifest file for an HTTP adaptive stream from a node, as in block 810. The computer circuitry can also be further configured to determine a physical layer goodput of the mobile device with the node, as in block 820. The computer circuitry can be further configured to select a representation in the manifest file for a selected period based, at least in part, on the physical layer goodput, as in block 830. The representation in the manifest file can be selected based on the physical layer goodput or the higher layer throughput estimates, depending on channel conditions, buffer conditions, or other conditions that are measured. For instance, at the startup of the HAS, or when channel conditions are varying relatively quickly, it can be of benefit to use the physical layer goodput estimate of a radio link between the mobile device and the node. After startup, when channel conditions are relatively stable, or when the buffer is substantially full, the higher layer throughput estimates may be used in place of the physical layer goodput, as previously discussed.

2. In one embodiment, the computer circuitry of the mobile device can be further configured to request a selected number of segments from the node that are in the representation, based, at least in part, on the physical layer goodput. The computer circuitry can select the representation for the selected period based, at least in part, on one of the physical layer goodput or a throughput estimate from a transport layer or a throughput estimate from an application layer. The computer circuitry can be configured to determine an average physical layer goodput over a selected number of previously received frame slots; and request a selected number of segments to be downloaded from the node within a predetermined period based on the average physical layer goodput.

3. The computer circuitry of the mobile device can be further configured to receive quality of service (QoS) parameters from the node, including a maximum bit rate (MBR) and a guaranteed bit rate (GBR); and request a selected number of segments from the node based, at least in part, on the physical layer goodput, the MBR, and the GBR.

4. In another embodiment, the computer circuitry of the mobile device can be further configured to select, at a startup of the HTTP adaptive stream: a predetermined number of segments to fill a buffer prior to operating the stream at the mobile device, based, at least in part, on the physical layer goodput; a representation for the selected period and a predetermined number of segments to provide a desired quality of the HTTP adaptive stream at the mobile device, based, at least in part, on an average physical layer goodput; a representation for the selected period and a predetermined number of segments to provide a minimized startup delay at the mobile device based, at least in part, on the average physical layer goodput; or a representation for the selected period and a predetermined number of segments to provide a delay bounded quality optimization at the mobile device based, at least in part, on the average physical layer goodput.

5. In another embodiment, the computer circuitry of the mobile device can be further configured to select the representation and request a selected number of segments during a steady state playback of the HTTP adaptive stream by: determining a ratio of an average of the physical layer goodput to the selected representation; and requesting more than one segment to be delivered per segment duration to build up a number of segments in a buffer of the mobile device when additional link bandwidth is available during the steady state playback, based, at least in part, on the average physical layer goodput.

6. The computer circuitry can be further configured to determine that the average physical layer goodput is increasing before requesting the more than one segment to be delivered per segment duration; and select a limit on a number of segments to be delivered per segment duration during the steady state playback.

7. The manifest file for the HTTP adaptive stream can be a media presentation description for a dynamic adaptive streaming over HTTP (DASH) adaptation set; or a metadata embedded in a 3GP file format.

8. Method for Receiving Http Adaptive Streaming

Figure 9:
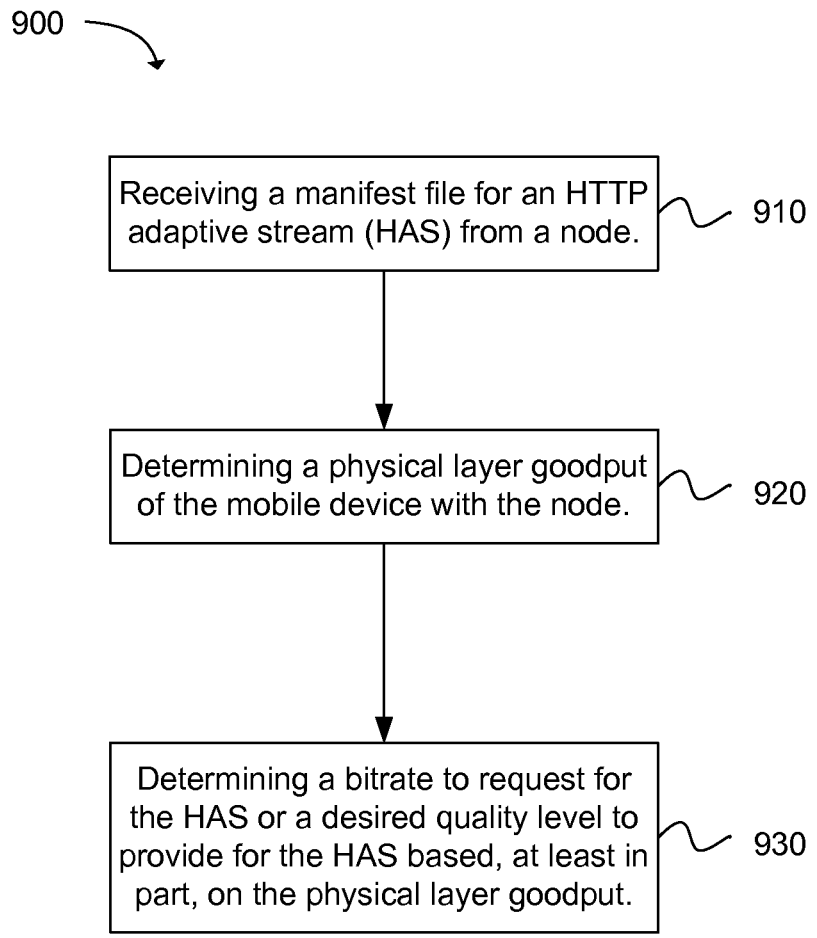
FIG. 9 depicts a flow chart of a method for receiving hyper-text transfer protocol (HTTP) adaptive streaming at a mobile device in accordance with an example.

Another example provides a method 900 for receiving hyper-text transfer protocol (HTTP) adaptive streaming at a mobile device, as shown in the flow chart in FIG. 9. The method may be executed as instructions on a machine, computer circuitry, or a processor for the mobile device (e.g. UE), where the instructions are included on at least one computer readable medium or one non-transitory machine readable storage medium. The method includes the operation of receiving a manifest file for an HTTP adaptive stream (HAS) from a node, as in block 910. An additional operation of the method is determining a physical layer goodput of the mobile device with the node, as in block 920. The physical layer goodput can be measured on one or more radio links that the mobile device uses to receive the HTTP adaptive streaming. Typically, a single radio link may be used. In addition, carrier aggregation may be used in which two or more radio links can be aggregated to provide additional bandwidth for the HTTP adaptive stream. In the case of carrier aggregation, the goodput of two or more radio links can be aggregated. A further operation of the method is determining a bitrate to request for the HAS or a desired quality level to provide for the HAS based, at least in part, on the physical layer goodput, as in block 930.

The operation of determining the bitrate in the method 900 can further comprise selecting a representation in the manifest file for a selected period based, at least in part, on the physical layer goodput; or requesting a selected number of segments from the node that are in the representation, based, at least in part, on the physical layer goodput. The operation of requesting the number of segments from the node can further comprise sending an HTTP get request from the mobile device to a web server, wherein a frequency of HTTP get requests is selected based, at least in part, on the physical layer goodput.

The method 900 can further comprise determining an average physical layer goodput over a selected number of previously received frame slots; and requesting an additional number of segments to be delivered to the mobile device per segment duration to build up a number of segments in a buffer of the mobile device when the average physical layer goodput is increasing.

In another embodiment, the method 900 further comprises using transport layer or application layer throughput information in place of the physical layer goodput to determine the bitrate to request for the HAS or the desired quality level to provide for the HAS based on a link condition of a radio link between the mobile device and the node; a network congestion level of the node; a client state; or a rate at which a buffer of the mobile device is being filled with the HAS.

As previously discussed, higher layer throughput information, such as transport layer or application layer throughput information can be used after startup and when the radio link is fairly stable. The network can set QoS parameters MBR/GBR based on network congestion levels. Physical layer goodput information can be used when an increase in a number of segments received at the mobile device can be increased by a threshold amount relative to the use the higher layer throughput information.

In one embodiment, the physical layer goodput information can be received periodically at a client operating on the mobile device from an application programming interface (API) with a radio component of the mobile device.

In another embodiment, the method 900 can further comprise receiving quality of service (QoS) parameters from the node, including a maximum bit rate (MBR) and a guaranteed bit rate (GBR); and requesting a selected number of segments from the node based, at least in part, on the physical layer goodput, the MBR, and the GBR.

The method 900 can be implemented in at least one non-transitory machine readable storage medium comprising a plurality of instructions that are adapted to be executed to implement the method.

Figure 10:
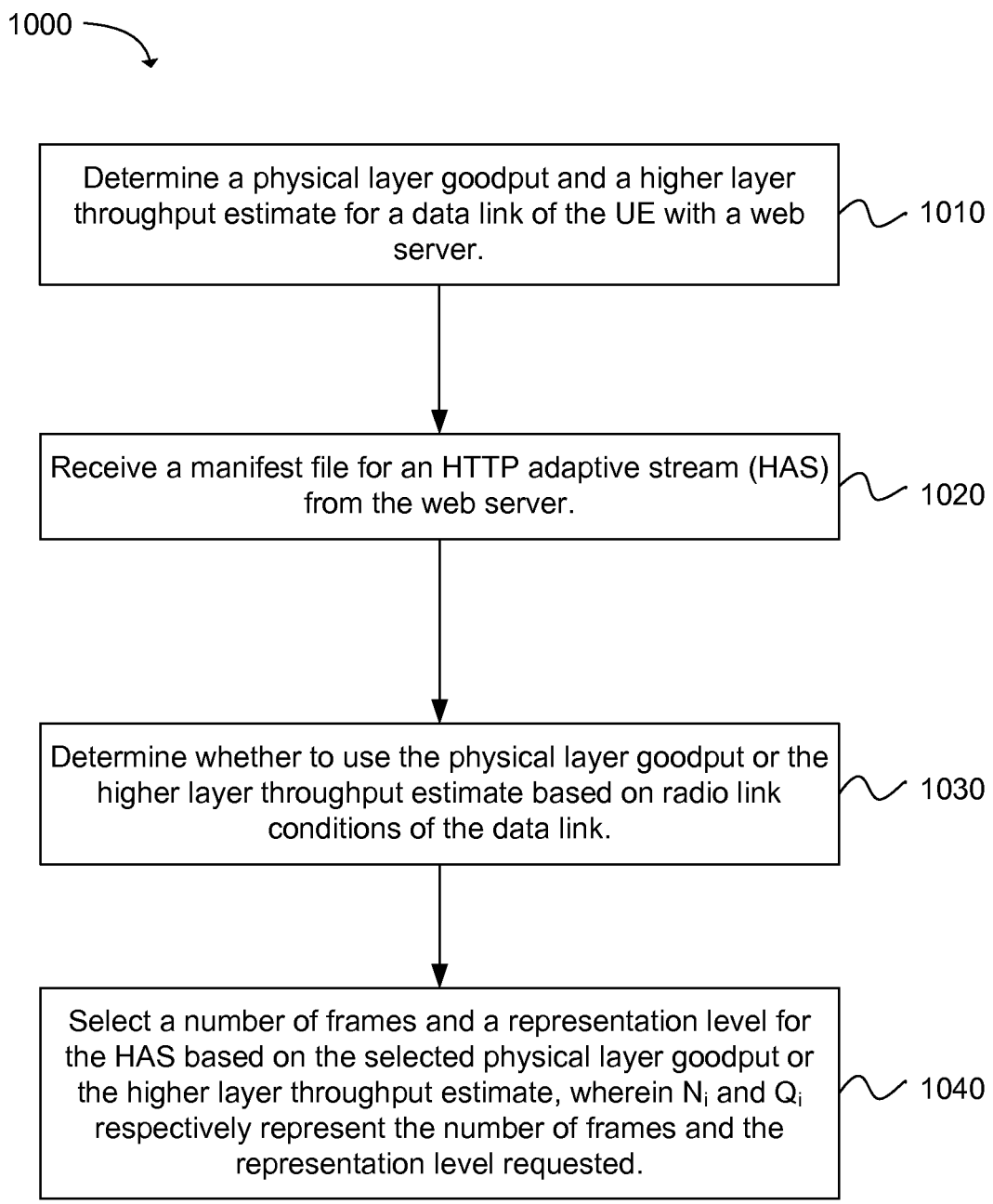
FIG. 10 depicts functionality of computer circuitry of a user equipment (UE) operable to perform link aware streaming adaptation in accordance with an example.

Another example provides functionality 1000 of computer circuitry of a user equipment (UE) operable to perform link aware streaming adaptation, as shown in the flow chart in FIG. 10. The functionality may be implemented as a method or the functionality may be executed as instructions on a machine, where the instructions are included on at least one computer readable medium or one non-transitory machine readable storage medium. The computer circuitry can be configured to determine a physical layer goodput and a higher layer throughput estimate for a data link of the UE with a web server, as in block 1010. The computer circuitry can be further configured to receive a manifest file for an HTTP adaptive stream (HAS) from the web server, as in block 1020. The computer circuitry can be further configured to determine whether to use the physical layer goodput or the higher layer throughput estimate based on radio link conditions of the data link as in block 1030. The computer circuitry can be further configured to select a number of frames and a representation level for the HAS based on the selected physical layer goodput or the higher layer throughput estimate, wherein $N_i$ and $Q_i$ respectively represent the number of frames and the representation level requested, as in block 1040.

The computer circuitry of FIG. 10 can be further configured to perform a quality-optimized startup by selecting a next available video adaptation rate when enough bandwidth is available based on the physical layer goodput. In one embodiment, the computer circuitry can be configured to select the number of frames, $Q_i$ and the representation level, $N_i$ to optimize a quality of the HAS at startup, using:

$$\left.\begin{array}{l} Q_i = \min(Q_{i-1}+1, Q_i^{sup}) \quad \text{if } (\delta_i \geq (1+\alpha)) \\ Q_i = \min(Q_{i-1}, Q_i^{sup}) \quad \text{otherwise} \\ N_i = S_{seg} \end{array}\right\} \text{s.t. } A_i \leq A_{thresh}^{StartUp}$$

$$\text{where } \delta_i = \frac{R_i^{PHY-Avg}}{b_{\min(Q_{i-1}+1,Q_i^{sup})}}, R_i^{PHY-Avg} = \frac{1}{T}\sum_{t=0}^{T-1} R_{i-t}^{PHY}, R_i^{PHY} = \frac{X_i}{\tau},$$

$X_i$ is a number of successfully received bits in an $i^{th}$ video frameslot, $\tau$ is a video frame duration, T is a number of frameslots, $S_{seg}$ is a number of frames in a segment, b is a rate of a video representation level download, $A_i$ is a total number of video frames received by the UE before the UE makes a request in frameslot i, $A_{thresh}^{StartUp}$ is a threshold number of video frames to be received before the HAS is displayed, $\delta_i$ represents a ratio of an average estimated physical layer throughput to a rate of a next video representation level possible, and $\alpha>0$ is a design parameter used to set a threshold $(1+\alpha)$ on the ratio $\delta_i$.

The computer circuitry of FIG. 10 can be further configured to select the number of frames $Q_i$ and the representation level, $N_i$ to bound a delay of the HAS for a selected quality level at startup, using:

$$Q_i = \arg\max_k b_k; f_k \leq F_i^{min} \text{ over } k = 1, 2, \ldots, N$$

$$N_i = 1$$

where $b_k$ is a bitrate of representation k of the HAS, $$f_k = \frac{R_i^{PHY-Avg}}{b_k \cdot \tau}, R_i^{PHY-Avg} = \frac{1}{T}\sum_{t=0}^{T-1} R_{i-t}^{PHY}, R_i^{PHY} = \frac{X_i}{\tau},$$

$X_i$ is a number of successfully received bits in an $i^{th}$ video frameslot, $\tau$ is a video frame duration, T is a number of frameslots, $$F_i^{min} = \frac{\text{\# Frames Required}}{\text{Time Available}} = \frac{B_{thresh}^{StartUp} - B_i}{\max(T_{thresh}^{StartUp} - i\cdot\tau, \tau)},$$

$B_i$ is a current video frame buffer level, $B_{thresh}^{StartUp}$ is a threshold number of frames to start playback of the HAS, and $T_{thresh}^{StartUp}$ is a target time to start playback. The threshold values $B_{thresh}^{StartUp}$ and $T_{thresh}^{StartUp}$ can be selected to obtain a tradeoff between video quality and a start-up delay.

Figure 11:
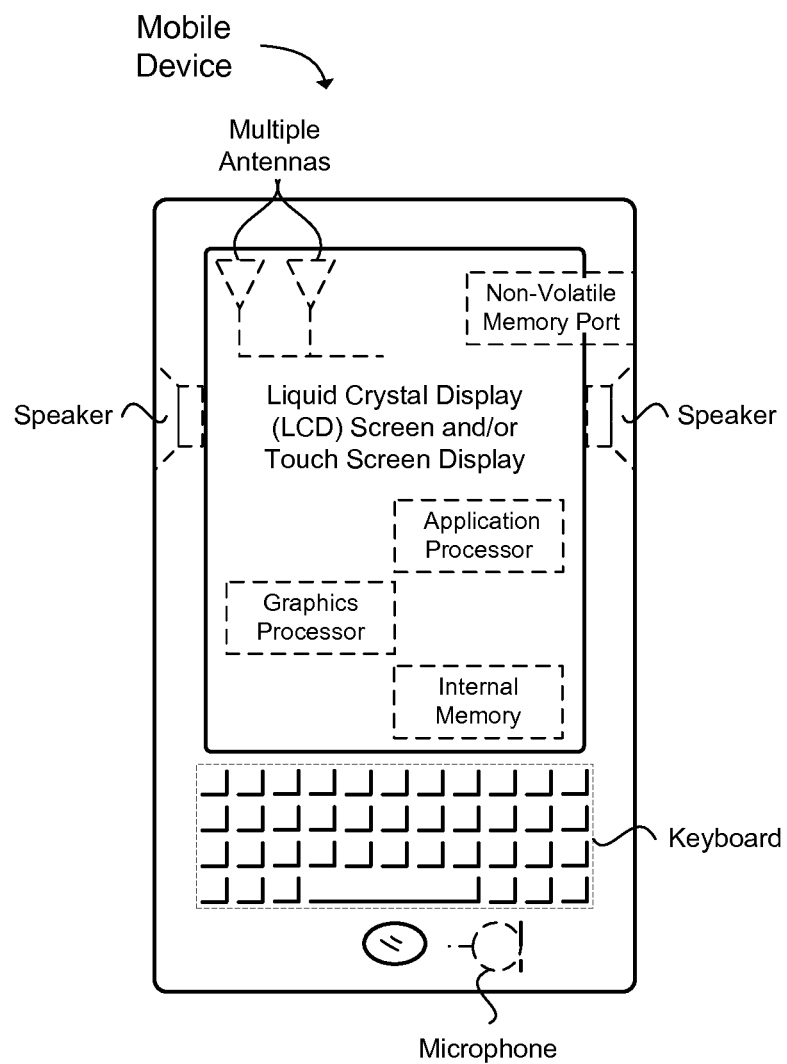
FIG. 11 illustrates a diagram of a wireless device (e.g., UE) in accordance with an example.

FIG. 11 provides an example illustration of the mobile device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 11 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A mobile device operable to receive hyper-text transfer protocol (HTTP) adaptive streaming (HAS), having computer circuitry configured to:
   receive a manifest file for an HTTP adaptive stream from a node;
   determine a physical layer goodput, $R_i^{PHY}$, of the mobile device with the node, wherein the physical layer goodput is given by: $R_i^{PHY}=X_i/\tau$, wherein $X_i$ is the number of successfully received bits in the $i^{th}$ video frameslot and $\tau$ is the video frame duration;
   determine one or more frame levels for the mobile device;
   determine a client state ($S_i$) for the mobile device based on the one or more frame levels; and
   select a number of frames ($N_i$) and a representation level ($Q_i$) for the HAS in the manifest file for a selected period based, at least in part, on the one or more frame levels for the mobile device, the client state ($S_i$) for the mobile device, and the physical layer goodput,
   wherein $N_i$ and $Q_i$ are selected to bound a delay of the HAS for a selected quality level at startup based in part on a first threshold value corresponding to a threshold number of frames to start playback of the HAS and a second threshold value corresponding to a target time to start playback, wherein the first threshold value and the second threshold value are selected to obtain a tradeoff between video quality and a start-up delay.

2. The computer circuitry of claim 1, wherein the computer circuitry is further configured to:
   request a selected number of segments from the node that are in the representation, based, at least in part, on the physical layer goodput.

3. The computer circuitry of claim 1, wherein the computer circuitry is further configured to:
   select the representation for the selected period based, at least in part, on one of the physical layer goodput or a throughput estimate from a transport layer or a throughput estimate from an application layer.

4. The computer circuitry of claim 1, wherein the computer circuitry is further configured to:
   determine an average physical layer goodput over a selected number of previously received frame slots; and
   request a selected number of segments to be downloaded from the node within a predetermined period based on the average physical layer goodput.

5. The computer circuitry of claim 1, wherein the computer circuitry is further configured to:
   receive quality of service (QoS) parameters from the node, including a maximum bit rate (MBR) and a guaranteed bit rate (GBR); and
   request a selected number of segments from the node based, at least in part, on the physical layer goodput, the MBR, and the GBR.

6. The computer circuitry of claim 1, wherein the computer circuitry is further configured to select, at a startup of the HTTP adaptive stream:
   a predetermined number of segments to fill a buffer prior to operating the stream at the mobile device, based, at least in part, on the physical layer goodput;
   a representation for the selected period and a predetermined number of segments to provide a desired quality of the HTTP adaptive stream at the mobile device, based, at least in part, on an average physical layer goodput;
   a representation for the selected period and a predetermined number of segments to provide a minimized startup delay at the mobile device based, at least in part, on the average physical layer goodput; or
   a representation for the selected period and a predetermined number of segments to provide a delay bounded quality optimization at the mobile device based, at least in part, on the average physical layer goodput.

7. The computer circuitry of claim 1, wherein the computer circuitry is further configured to select the representation and request a selected number of segments during a steady state playback of the HTTP adaptive stream by:
   determining a ratio of an average of the physical layer goodput to the selected representation; and
   requesting more than one segment to be delivered per segment duration to build up a number of segments in a buffer of the mobile device when additional link bandwidth is available during the steady state playback, based, at least in part, on the average physical layer goodput.

8. The computer circuitry of claim 7, wherein the computer circuitry is further configured to:
   determine that the average physical layer goodput is increasing before requesting the more than one segment to be delivered per segment duration; and
   select a limit on a number of segments to be delivered per segment duration during the steady state playback.

9. The computer circuitry of claim 1 wherein the manifest file for the HTTP adaptive stream is:
   a media presentation description for a dynamic adaptive streaming over HTTP (DASH) adaptation set; or
   metadata embedded in a 3GP file format.

10. A method for receiving hyper-text transfer protocol (HTTP) adaptive streaming at a mobile device, the method comprising:
    receiving a manifest file for an HTTP adaptive stream (HAS) from a node;
    determining a physical layer goodput, $R_i^{PHY}$, of the mobile device with the node, wherein the physical layer goodput is given by: $R_i^{PHY}=X_i/\tau$, wherein $X_i$ is the number of successfully received bits in the $i^{th}$ video frameslot and $\tau$ is the video frame duration;
    determining one or more frame levels for the mobile device;
    determining a client state ($S_i$) for the mobile device based on the one or more frame levels; and
    selecting a number of frames ($N_i$) and a representation level ($Q_i$) for the HAS based, at least in part, on the one or more frame levels for the mobile device, the client state ($S_i$) for the mobile device, and the physical layer goodput,
    wherein $N_i$ and $Q_i$ are selected to bound a delay of the HAS for a selected quality level at startup based in part on a first threshold value corresponding to a threshold number of frames to start playback of the HAS and a second threshold value corresponding to a target time to start playback, wherein the first threshold value and the second threshold value are selected to obtain a tradeoff between video quality and a start-up delay.

11. The method of claim 10, wherein determining the bitrate further comprises:
   selecting a representation in the manifest file for a selected period based, at least in part, on the physical layer goodput; or
   requesting a selected number of segments from the node that are in the representation, based, at least in part, on the physical layer goodput.

12. The method of claim 11, wherein requesting the number of segments from the node further comprises:
   sending an HTTP get request from the mobile device to a web server, wherein a frequency of HTTP get requests is selected based, at least in part, on the physical layer goodput.

13. The method of claim 10, further comprising:
   determining an average physical layer goodput over a selected number of previously received frame slots; and
   requesting an additional number of segments to be delivered to the mobile device per segment duration to build up a number of segments in a buffer of the mobile device when the average physical layer goodput is increasing.

14. The method of claim 10, further comprising using transport layer or application layer throughput information in place of the physical layer goodput to determine the bitrate to request for the HAS or the desired quality level to provide for the HAS based on:
   a link condition between the mobile device and the node;
   a network congestion level of the node;
   a client state; or
   a rate at which a buffer of the mobile device is being filled with the HAS.

15. The method of claim 10, further comprising receiving the physical layer goodput information periodically at a client operating on the mobile device from an application programming interface (API) with a radio component of the mobile device.

16. The method of claim 10, further comprising:
   receiving quality of service (QoS) parameters from the node, including a maximum bit rate (MBR) and a guaranteed bit rate (GBR); and
   requesting a selected number of segments from the node based, at least in part, on the physical layer goodput, the MBR, and the GBR.

17. At least one non-transitory machine readable storage medium comprising a plurality of instructions adapted to be executed to implement the method of claim 10.

18. A user equipment (UE) operable to perform link aware streaming adaptation, having computer circuitry configured to:
   determine a physical layer goodput, $R_i^{PHY}$, and a higher layer throughput estimate for a data link of the UE with a web server, wherein the physical layer goodput is given by: $R_i^{PHY}=X_i/\tau$, wherein $X_i$ is the number of successfully received bits in the $i^{th}$ video frameslot and $\tau$ is the video frame duration;
   determine one or more frame levels for the UE;
   determine a client state ($S_i$) for the UE based on the one or more frame levels;
   receive a manifest file for an HTTP adaptive stream (HAS) from the web server;
   determine whether to use the physical layer goodput or the higher layer throughput estimate based on radio link conditions of the data link; and
   select a number of frames ($N_i$) and a representation level ($Q_i$) for the HAS based on the one or more frame levels for the UE, the client state ($S_i$) for the UE, and the selected physical layer goodput,
   wherein $N_i$ and $Q_i$ are selected to bound a delay of the HAS for a selected quality level at startup based in part on a first threshold value corresponding to a threshold number of frames to start playback of the HAS and a second threshold value corresponding to a target time to start playback, wherein the first threshold value and the second threshold value are selected to obtain a tradeoff between video quality and a start-up delay.

19. The user equipment of claim 18, further configured to perform a quality-optimized startup by selecting a next available video adaptation rate when enough bandwidth is available based on the physical layer goodput.

20. The user equipment of claim 18, further configured to select the number of frames $N_i$, and the representation level, $Q_i$, to optimize a quality of the HAS at startup, using:

$$\left. \begin{array}{l} Q_i = \min(Q_{i-1}+1, Q_i^{sup}) \quad \text{if } (\delta_i \geq (1+\alpha)) \\ Q_i = \min(Q_{i-1}, Q_i^{sup}) \quad \text{otherwise} \\ N_i = S_{seg} \end{array} \right\} \text{ s.t. } A_i \leq A_{thresh}^{StartUp}$$

$$\text{where } \delta_i = \frac{R_i^{PHY-Avg}}{b_{\min(Q_{i-1}+1, Q_i^{sup})}}, R_i^{PHY-Avg} = \frac{1}{T}\sum_{t=0}^{T-1} R_{i-t}^{PHY}, R_i^{PHY} = \frac{X_i}{\tau},$$

$X_i$ is a number of successfully received bits in an $i^{th}$ video frameslot, $\tau$ is a video frame duration, T is a number of frameslots, $S_{seg}$ is a number of frames in a segment, b is a rate of a video representation level download, $A_i$ is a total number of video frames received by the UE before the UE makes a request in frameslot i, $A_{thresh}^{StartUp}$ is a threshold number of video frames to be received before the HAS is displayed, $\delta_i$ represents a ratio of an average estimated physical layer throughput to a rate of a next video representation level possible, and $\alpha > 0$ is a design parameter used to set a threshold $(1+\alpha)$ on the ratio $\delta_i$.

21. The user equipment of claim 18, further configured to select the number of frames $N_i$, and the representation level $Q_i$, to bound a delay of the HAS for a selected quality level at startup, using:

$$Q_i = \arg\max_k b_k; f_k \leq F_i^{min} \text{ over } k = 1, 2, \ldots, N$$

$$N_i = 1$$

where $b_k$ is a bitrate of representation k of the HAS, $$f_k = \frac{R_i^{PHY-Avg}}{b_k \cdot \tau}, R_i^{PHY-Avg} = \frac{1}{T}\sum_{t=0}^{T-1} R_{i-t}^{PHY}, R_i^{PHY} = \frac{X_i}{\tau},$$

$X_i$ is a number of successfully received bits in an $i^{th}$ video frameslot, $\tau$ is a video frame duration, T is a number of frameslots, $$F_i^{min} = \frac{\text{\# Frames Required}}{\text{Time Available}} = \frac{B_{thresh}^{StartUp} - B_i}{\max(T_{thresh}^{StartUp} - i \cdot \tau, \tau)},$$

$B_i$ is a current video frame buffer level, $B_{thresh}^{StartUp}$ is the threshold number of frames to start playback of the HAS and corresponds to the first threshold value, and $T_{thresh}^{StartUp}$ is the target time to start playback and corresponds to the second threshold value.

22. The user equipment of claim 21, wherein the threshold values $B_{thresh}^{StartUp}$ and $T_{thresh}^{StartUp}$ are selected to obtain the tradeoff between video quality and the start-up delay.

* * * * *